F. C. GREENE.
CAR DUMPING MECHANISM.
APPLICATION FILED AUG. 15, 1906.

976,168.

Patented Nov. 22, 1910.
7 SHEETS—SHEET 1.

Fig. 1.

WITNESSES:
Robt R Millard
O. V. Greene

Frank C Greene
INVENTOR

BY
J. D. Fay
ATTORNEY

UNITED STATES PATENT OFFICE.

FRANK C. GREENE, OF CLEVELAND, OHIO.

CAR-DUMPING MECHANISM.

976,168.

Specification of Letters Patent.  Patented Nov. 22, 1910.

Application filed August 15, 1906.  Serial No. 330,652.

*To all whom it may concern:*

Be it known that I, FRANK C. GREENE, a citizen of the United States, resident of Cleveland, county of Cuyahoga, and State of Ohio, have invented a new and useful Improvement in Car-Dumping Mechanism, of which the following is a specification, the principle of the invention being herein explained and the best mode in which I have contemplated applying that principle, so as to distinguish it from other inventions.

My invention relates to improvements in car-dumping mechanism, particularly in dumping mechanism of the kind employed at coal-mines for dumping the mine cars at the tipple. A great variety of apparatus has been heretofore evolved for this service, the general objects sought to be accomplished being the provision of a dump that will be rapid and automatic in its operation and at the same time relatively simple and inexpensive in construction.

In addition to the above results I have sought in the present device to provide means for automatically regulating the operation of the dump and for similarly opening the door or end-gate of the car when in the dumping position.

Said invention consists of means hereinafter fully described and specifically set forth in the claims.

The annexed drawings and the following description set forth in detail certain means embodying the invention, such disclosed means constituting but one of various mechanical forms in which the principle of the invention may be used.

The said annexed drawings: Figs. 6, 7 and 8 represent a device designed to operate in conjunction with the foregoing dumping mechanism to raise the end-gate of the car while it is being dumped; of such figures.

An inspection of the above described figures will readily disclose that as there shown my improved car dumping mechanism is designed to operate in conjunction with a superposed track system. It is not deemed necessary to here point out all the features that render the use of superposed tracks preferable to that of single or parallel tracks. As is well known, however, a great saving of space is thereby effected and this is a consideration of prime importance, since the amount of structural material required in building the tipple is made much less and the cost of the latter proportionately reduced. I do not mean to indicate by the above that my improved dump is limited in its application to use with superposed tracks only; as will be explained later, it can be employed with slight modification and equal success as a "cross-over" dump.

Figure 1:
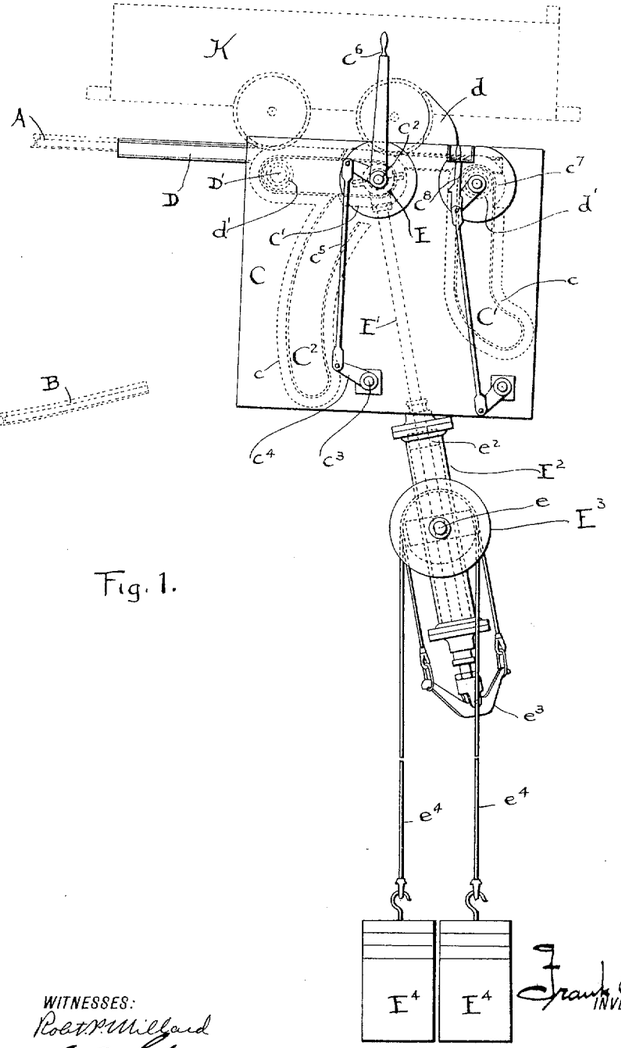
Figure 1 represents a side elevation of a dump constructed in accordance with the principle of my invention, the mechanism of such dump being shown as occupying its normal position preparatory to and pending the reception of a car thereon.
Figure 4:
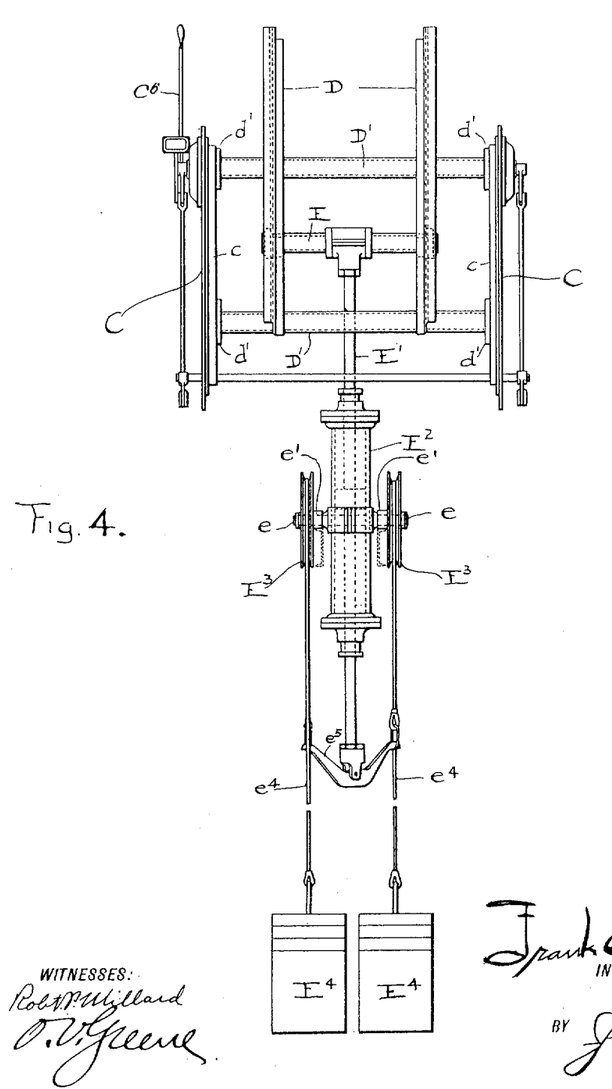
Fig. 4 is an end elevation of the dump as viewed from the right in the foregoing figures, the position of the dumping mechanism being the same as that shown in Fig. 2.

In the arrangement illustrated, the upper of the superposed tracks, which here forms the car-delivery track, A, is preferably inclined downwardly toward the dumping station, so that cars, upon being placed thereon, will of their own weight run to such station. Similarly the lower, car-discharge, track B, upon which the car is placed after having been dumped, inclines in the opposite direction to conduct the cars back to the mine opening. The frame work of my dumping device consists simply of two vertically disposed plates C, Fig. 4, suitably supported in the tipple structure, not shown. Each of these plates C lies parallel with and a little without the respective rails of superposed tracks A, B, and between the same is oscillatorily mounted, in a manner presently to be set forth, a bodily reciprocable or "floating" track section D, Figs. 1 and 4. In its normal position the rails of such track section D are designed to register with the rails of car-delivery track A, as appears in Fig. 1; in another position such rails register with those of lower, car-discharge track B. In its movements from one such position to the other, track section D is supported on and oscillates about a transversely disposed shaft E, Figs. 1, 2, 3 and 4. This shaft E is mounted in turn upon a vertically reciprocable member $E^1$ that in addition to such reciprocable movement is capable of oscillation about a fixed axis parallel with shaft E. This member $E^1$ comprises, in fact, a piston the head $e^2$ of which operates in a cylinder $E^2$, such cylinder being provided with trunnions $e$ that are mounted in suitable bearings $e^1$, Fig. 4, therefor provided in the tipple structure. Piston $E^1$ is prolonged beyond head $e^2$ so as to project beyond the lower end of the cylinder $E^2$. To a yoke $e^3$ on such lower piston end are attached, by means of cables $e^4$ passing over pulleys $E^3$ that are conveniently mounted upon the outer ends of trunnions $e$, suitable counterweights $E^4$, such counterweights being adapted to maintain track-section D when unloaded in its normal position as shown in Fig. 1. Counterweights $E^4$, however, are so gaged in weight that the weight of a loaded car, received upon track-section D, will be sufficient to overbalance them and cause such track-section to descend until it rests in register with the lower of superposed tracks A, B. Immediately upon the discharge of a car from the track-section the effect of the counterweights will obviously be to return such track-section again into position in register with upper track A.

The function of cylinder $E^2$, aside from serving as an oscillatory bearing for the track-section supporting-member $E^1$, is to provide suitable retarding means whereby the depression of such track-section under the weight of a car received thereon and its subsequent rise under the actuation of counterweights $E^4$, may be automatically controlled. To this end such cylinder, in the form shown in Figs. 1, 2, 3 and 4, is filled with a quantity of liquid, preferably dead oil, for the transfer of which from one end of the piston to the other as piston-head $e^2$ reciprocates, a pass-pipe $E^5$ is provided. This pass-pipe is preferably connected with the piston at several points intermediate of its respective end connections therewith. As shown there are two such additional connections on each side of the center of the cylinder. Each of these connections is provided with an appropriate valve for regulating the flow of the oil therethrough, the outermost $e^5$ of such valves being simply check valves that permit the flow of oil inwardly only, while the remaining intermediately located valves $e^6$ are preferably of the regular globe pattern and are adapted to permit an adjustable flow in both directions. It will be clear that by proper adjustment of valves $e^6$ the operation of piston head $e^2$ in the cylinder, and therefore the reciprocation of track-section D, may be regulated to a nicety, while the respective check valves $e^5$, by confining a limited quantity of the oil at each end of the cylinder as the piston nears the end of its corresponding stroke, cushions such stroke and eliminates any jar that might otherwise be caused by the track-section coming too suddenly to rest.

If for any reason the coal in the car resting upon such track-section is not readily dislodged by the simple tilting movement of the track-section, it may be desirable to impart a jerky or spasmodic movement to the latter. This may be readily effected by means of the connections just described as accessory to cylinder $E^2$; for by entirely closing the valves $e^6$, and then alternately opening and closing any one thereof that happens to be located in advance of the piston as it moves in the cylinder, the downward movement of the car may be interrupted as often as necessary before it reaches its final lower position, and the coal be thus caused to pass therefrom in an even stream and not in one mass as might be the case were reliance wholly placed on the shock of stopping the track-section supporting such car at the end of its downwardly tilting movement.

Figure 5:
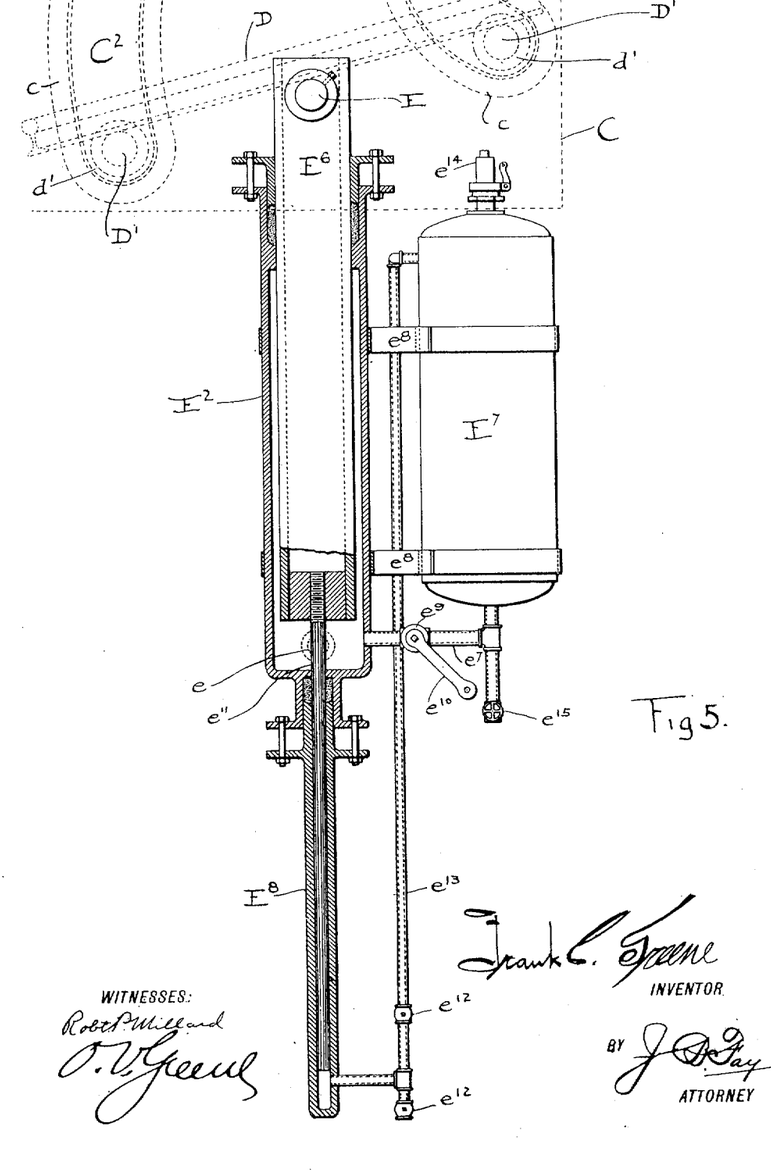
Fig. 5 is an enlarged detail view, partly in cross-section, of a modified form of regulating mechanism that is shown in simpler form in connection with the preceding views.
Figure 6:
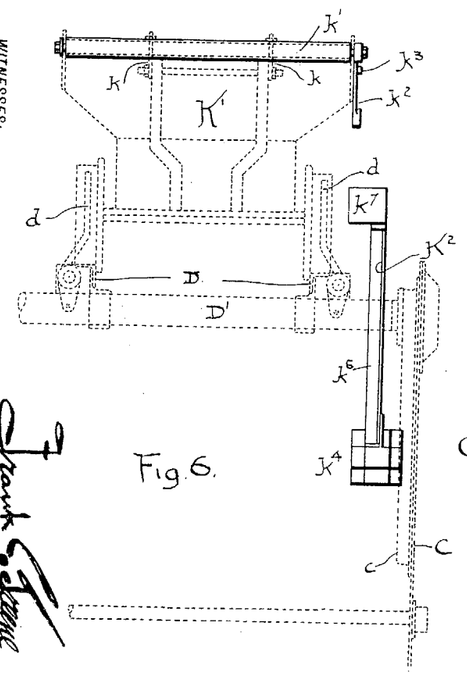
Figs. 6 and 7 are respectively an end view and a side elevation of the device in question in its normal position.

Obviously other means than counterweights $E^4$ might be utilized to return the member $E^1$ and track-section D to their normal positions. A device for this purpose doing away with such counterweights and involving at the same time a modification in the construction of cylinder $E^2$, is shown in Fig. 5. In the illustration of this device presented by such Fig. 5, the parts of the dump proper are shown in positions corresponding with the lower position of track-section D. The modification in the construction of cylinder $E^2$ referred to involves the omission of pass-pipe $E^5$ and connections and the substitution for piston $E^1$ and piston head $e^2$ of a plunger $E^6$ of diameter only approximately equal to that of the interior of the cylinder. The dead oil with which the cylinder, as before, is filled instead of flowing through a pass-pipe from one side to the other of a piston head is allowed to flow through a pipe $e^7$ into an air tank $E^7$ that, because of the oscillatory movement of cylinder $E^2$ on its axis, is preferably rigidly attached thereto as by arms $e^8$. In the normal position of track-section D, when the plunger $E^6$ occupies its uppermost position in cylinder $E^2$, the residuum of air in tank $E^7$ should be under sufficient pressure to amply sustain the weight of such plunger and the track-section supported thereby. Obviously the downward movement of the plunger when a loaded car is received on the dump, with the attendant forcing of the greater portion of the oil in the cylinder $E^2$ across into the tank $E^7$, will effect a considerable rise in such air pressure, so that the return of plunger and track section will begin immediately upon the discharge of the emptied car from the latter. For the service assumed in the designing of this particular dump, with the relative dimensions of the several parts of the device as shown, a pressure of about forty pounds to the square inch in the first instance, and of about sixty pounds in the second, should be had. It is a matter of calculation, merely, to so vary the dimensions of cylinder and tank and the quantity of oil used as to secure any desired initial and final pressure.
The movements of the dump, when the above type of regulating mechanism is used in connection with the track-section supporting-member, are of course cushioned upon the resilient column of air in tank $E^7$, and all shock and jar thus practically eliminated. To introduce the possibility of manual control, in case such should be found desirable, it is simply necessary to place a cut-off valve $e^9$ in the pipe $e^7$ leading from cylinder $E^2$ to tank $E^7$. Suitable operating mechanism, not shown, connected with a lever-arm $e^{10}$ attached to the stem of such valve may be utilized to render the same operable from any convenient station about the dump, or elsewhere in the tipple structure. To provide against the pressure of air in tank $E^7$ from falling below a working minimum by leakage or otherwise, a rod $e^{11}$ mounted in the lower end of plunger $E^6$ and working in a pump cylinder $E^8$ is adapted, by means of a set of properly disposed check-valves $e^{12}$ $e^{12}$, to force through a pipe $e^{13}$ a certain amount of air into such tank upon every downward stroke of the plunger.
Similarly a safety valve $e^{14}$ on the top of the tank prevents the pressure in the same from ever exceeding a predetermined maximum. For the purpose of draining tank $E^7$ or introducing additional oil therein, a cock $e^{15}$ is provided at its lower end.

Figure 2:
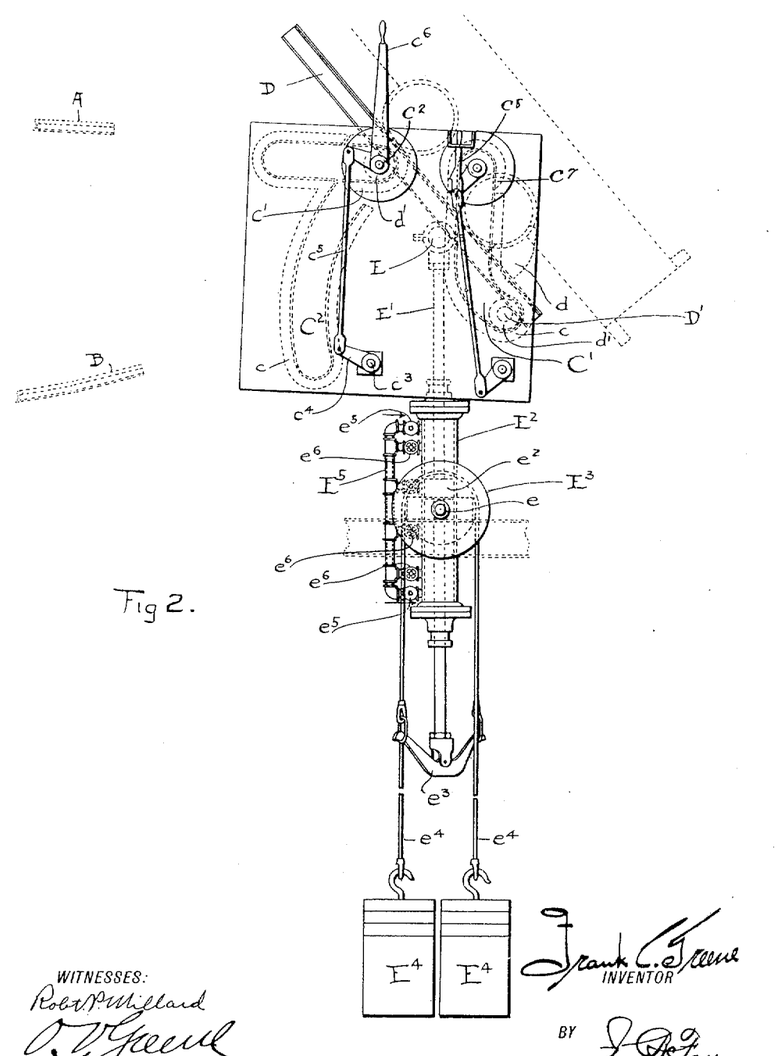
Fig. 2 is a similar side elevation with the parts shown in their second or dumping position; and in Fig. 3, the dump is again shown in side elevation; the parts, however, appearing in their final, or discharge, position.
Figure 3:
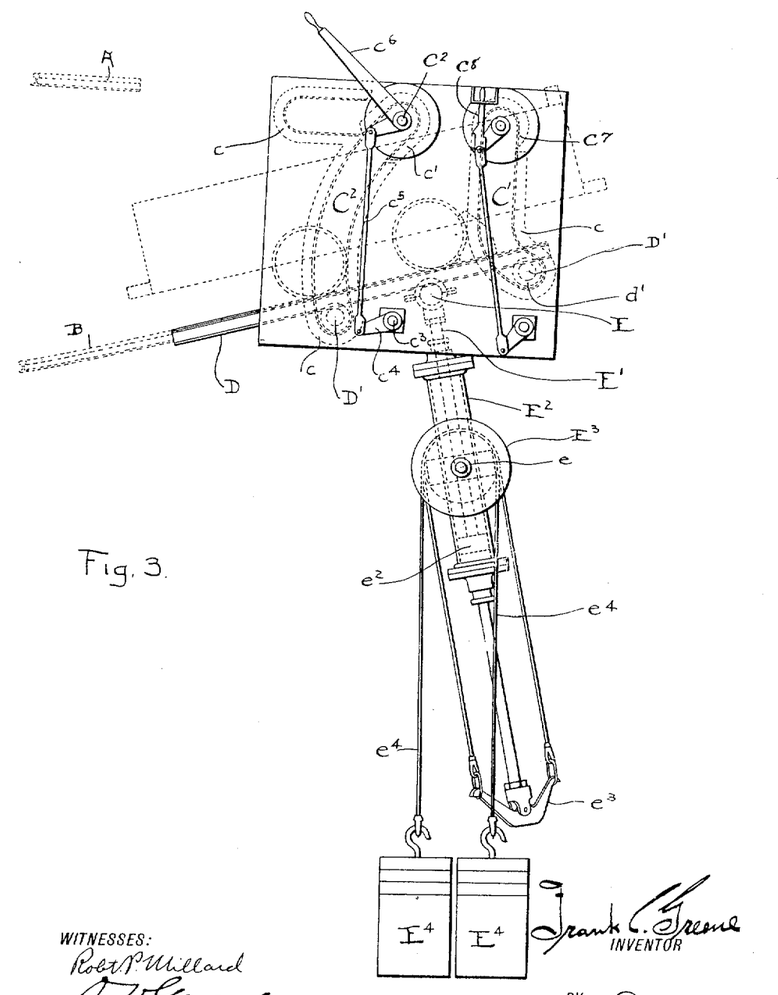

To revert again to the dumping mechanism proper, it will be observed that track-section D should incline in one direction when in register with car-delivery track A in order that the car may run directly thereon without the application of any exterior force or power, suitable stops $d$ being provided for preventing it from running beyond; such track section must incline in the opposite site direction and preferably at a sharper angle when in register with car discharge tracks B, in order that the car may be given the impetus necessary to cause it to promptly move off such track-section; and in yet a third position, intermediate in time between the assumption, respectively, of the positions just named, said track-section must incline, in the case in hand, forwardly, at an angle sharp enough to cause it to dump its contents.
In order to effect the oscillation of the track-section upon the shaft E to occupy the several positions described as such shaft rises and falls with supporting member $E^1$, I provide the means now to be described.
Such means comprise a set of two guide-ways $C^1$ $C^2$ on the inturned face of each of plates C, between which track-section D moves, and a set of guide pulleys or rollers $d^1$ on each side of such track-section engaging the corresponding guide-ways. These guide-ways are most easily formed by riveting or otherwise attaching to such plates angle bars $c$ that have been previously bent to the desired curves. The rollers $d^1$ that engage guide-ways $C^1$ $C^2$ are mounted upon the outer ends of two transversely disposed shafts $D^1$ upon which the rails forming track-section D rest, and which form, in fact, the whole of the frame work of such track-section. In addition to the simplicity of structure thus attained a desirable degree of lightness is secured by using sections of pipe for such shafts $D^1$. The conformation of guide-ways $C^1$ $C^2$, it is taken, is shown with sufficient clearness in the figures to require little description other than to state that guide-way $C^1$ comprises a substantially vertical portion that terminates at its lower end in a forwardly turning portion; while guide-way $C^2$ comprises a substantially horizontal portion at the top and a second longer portion connected with the forward end of such first portion and extending downwardly therefrom on an arc having the lower end of guide-way $C^1$ for its center. This lower end is desirably turned forward a trifle so as to form a pocket in which the front guide-roller will be locked so long as the rear guide-roller is in the downwardly extending curved portion of the rear guide-way. By the means just described, the respective ends of the track-section are caused to move in desired sequence to effect the dumping of the car and thereupon to return the track-section to its normal position. For a reason presently to appear, it is necessary that the downward movement of the rearmost of guide-rollers $d^1$ along such arc portions of guide-ways $C^2$ be capable of being delayed;
for this purpose a latch requires to be supplied that in its most convenient form consists of a section $c^1$ of angle bar $c$ pivotally mounted so as to be oscillatory about an axis $c^2$ and so bent as to register in one position about such axis with the upper horizontal portion of such guideway $C^2$ and in another position with the vertically disposed arc portion of the same, Figs. 1, 2 and 3. In Figs. 1 and 2 such latch is shown in its first position; in Fig. 3, in its second position; and from an inspection of these figures, it will be seen that when the latch is thus in register with either portion of the groove, the other portion is temporarily cut off. Simultaneous operation of latches $c^1$, there being two, of course, one on each side, is provided for by connecting the same through suitable mechanism including a rock-shaft $c^3$, lever-arms $c^4$ and rods $c^5$. For actually effecting their operation, a hand-lever $c^6$ is provided as shown, but other more removed, and, if found desirable, automatically car-actuated means may be substituted for such lever.

To set forth the operation of the dump as thus far described let it be assumed that track-section D occupies the normal position shown in Fig. 1. Counterweights $E^4$, or the pressure of the air in tank $E^7$, depending upon which type of regulating device is used, will retain the track-section in such position until a car, K, enters thereon from car-delivery track A. As soon as such car passes beyond the axial line of the rearmost of guide-rollers $d^1$, which rest, at this stage, at the rear ends of the horizontal portions of the corresponding guide-ways $C^2$, the track-section begins to tilt forwardly, front guide-rollers $d^1$ descending in guide-ways $C^1$. Such tilting movement ceases only when these front rollers reach the bottom of such guide-ways $C^1$, by which time the rear rollers have moved forwardly into the latch members $c^1$, and the car, occupies its full dump position. The end-gate of the car having been opened pending such descent, its contents are simultaneously discharged. This tilting of the track-section will of course depress supporting-member $E^1$ with corresponding actuation of piston-head $e^2$ where the type of regulating device employed is the one shown in the first four figures. For the position of the piston head at this stage, see Fig. 2. The car being completely dumped of its contents, hand-lever $c^6$ is operated to throw latch $c^1$ into position to allow the rear end of track-section to descend. During this movement the forward guide-rollers $d^1$, resting in the lower ends of guide-ways $C^1$, form a fixed fulcrum about which the track-section turns, the rear guide-rollers moving downwardly in the arc-portions of guide-ways $C^2$. When the latter finally come to rest the track-section is in register with lower track B and the empty car passes off onto the same. When thus relieved of the weight of the car, the upward movement of the track-section under the influence of counterweights $E^4$ begins. First the rear-end is swung upwardly, rear guide-rolls $d^1$ moving through the same arc-portions of guide-ways $C^2$ that they had followed previously in coming down. At the upper end of such swing, latches $c^1$ are encountered and automatically returned, by the force of the impact of the rollers therewith, to their normal positions. The rear rollers now being free to move back in the horizontal portion of guide-ways $C^2$, the front end of the track-section is left free to rise and the full normal position is thereupon regained. The arrangement of valves $e^5$ $e^6$ and the adjustment of the latter, is such as to permit celerity of movement at those stages in the above described operation where desired. This would be particularly in the return movement of the track-section, a slow motion being necessary in the first stage of the down movement, while the car is being dumped, only.

The object, of course, in having cylinder $E^2$ oscillatorily mounted upon trunnions $e^2$ is that piston $E^1$ may readily accommodate itself to the various positions of the track-section as the latter swings first one way, then the other. The shock is deadened at the conclusion of each completed movement by the same cylinder. Where the type of regulating device shown in Fig. 5 is employed the action is just the same, the only difference being that the pressure of the air in tank $E^7$ is utilized to return the track-section to its upper position.

Figure 7:
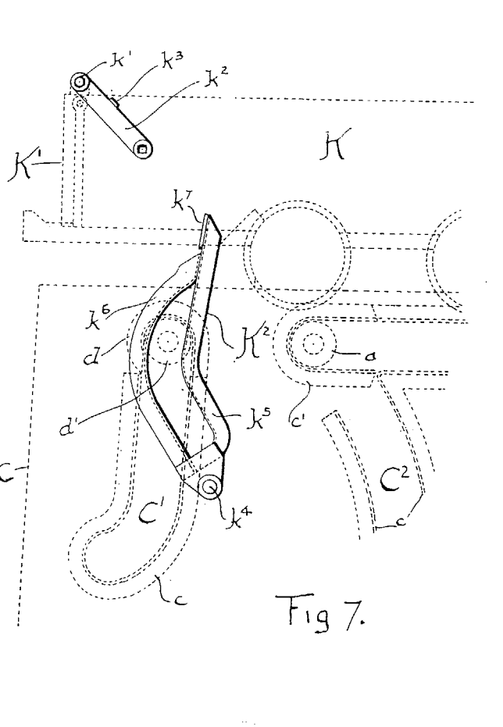
Figure 8:
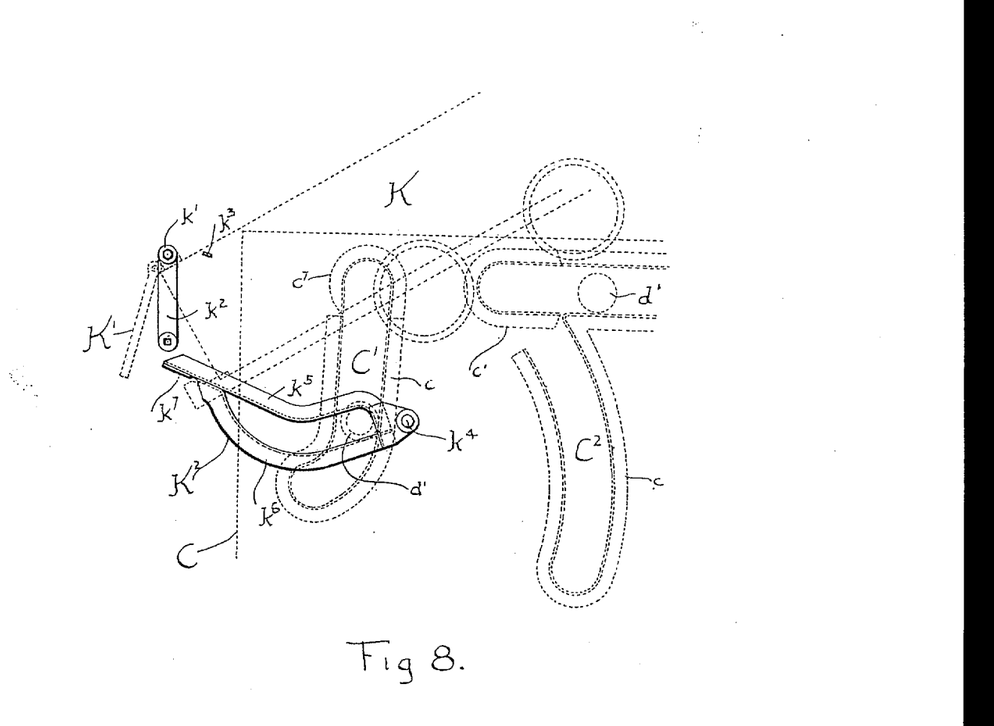
Fig. 8 shows the same in the position occupied at the conclusion of an operation.

As has been stated, the end-gate of the car upon the tilting track-section requires to be opened as the latter approaches its dumping position in order that the coal may be free to discharge. Obviously various approved ways for accomplishing such opening may be employed or it may even be done manually. Since, however, one of the objects of my invention is the reduction of the force of men required to operate a tipple, some form of automatic device should be provided in connection with the dumping mechanism above described. To the end of providing means particularly designed to coöperate with such mechanism, I have devised the simple arrangement shown in Figs. 6, 7 and 8. This arrangement involves providing the cars with a special form of end-gate $K^1$, Fig. 6, which differs from the gate ordinarily employed in that, instead of being hung on a fixed pivotal axis across its top and having a catch normally securing its bottom in place, it is hung on an eccentrically mounted pivotal axis conveniently formed in arms $k$ that project from a transverse rock-shaft $k^1$. In the normal position of such rock-shaft, shown in Figs. 6 and 7, arms $k$ are turned downwardly and the gate thereby depressed so as to engage with its lower end a suitable keep or other retaining device on the car floor. The weight of the door will tend naturally to swing it shut, and when once closed it will remain fixed in place until shaft $k^1$ is rocked outwardly and arms $k$ thereby raised. To thus rock the shaft a lever arm $k^2$ is mounted upon it at one end so as to lie closely against the car. When the gate is shut as has been described this arm is swung back against a stop $k^3$ on the side of the car. Operation of shaft $k^1$, then, to open the gate will be accomplished by swinging this arm forwardly through an angle of about forty-five degrees. Pivotally mounted on the inner face of the frame plate C, adjacent to which the sides of successive cars bearing the lever-arms $k^2$ will lie as such cars are dumped, is an arm $K^2$ that when properly oscillated is adapted to engage lever-arm $k^2$ and actuate the same. This arm $K^2$ is connected directly with the tilting track section so as to be operated simultaneously with the same. Such operative connection is easily made by disposing the pivotal axis $k^4$ of arm $K^2$ to the rear of guideway $C^1$ and forming such arm of two parallel portions $k^5$ $k^6$ between which the forward guide shaft $D^1$ is inclosed. As the ends of such shaft descend in guide-ways $C^1$ it will hence be obvious that arm $K^2$ will be swung forward, and its upper end on which is mounted a plate $k^7$, moving more rapidly than the car K upon track-section D, will overtake the same and throw the gate-actuating arm $k^2$ thereon forwardly and so permit the car to dump, Fig. 8. When the track-section D is returned to its normal position this arm $K^2$ is likewise raised and the operation just described may thereupon be repeated with the succeeding car.

The above described specific type of end-gate construction and the device coöperating therewith to open the same, form the subject-matter of a separate application filed June 19, 1907, Serial No. 376,693.

The foregoing end-gate and mechanism for opening the same form the subject matter of a divisional application which has issued into Patent No. 916,401, dated March 23, 1909.

As was earlier indicated my improved dumping mechanism, including the device that operates, as has been shown, to open the end-gates of the cars, is not confined in its application to the particular situation, that of a track-end dump, in connection with which it here appears. In fact the apparatus, almost exactly as it stands, can be used with equal success as a "cross-over" dump. For this purpose the modifications involved are but few, the chief one being the use of removable stop-blocks $d$, preferably of the well known type shown in Fig. 6, instead of the fixed ones or the simple upturned rail-ends that would otherwise be employed. In the use of the mechanism as a cross-over dump, furthermore, its manner of operation is, if anything, simplified, for the third oscillation of track-section D, that about its forward guide-shaft $D^1$ incidental to the discharge of the emptied car upon the lower track B, is done away with. Instead, the counterweights, or air pressure, as the case may be, are adjusted to restore the track-section with the car still thereon to its normal position just as soon as the car has been dumped. When the track-section is thus restored, the movable stops $d$ are turned aside and the car permitted to continue on its way. To lock the track-section in place pending this last step it is desirable to provide latches $c^7$ for the forward end thereof similar to the ones $c^2$ previously described as being used in connection with the guide-ways $C^2$. As in the case of this first latch, so latch $c^7$ comprises simply the recurved portion of the angle-bar $c$ of which the corresponding guide-ways $C^1$ is formed, such end-portion being pivotally mounted so as to register in one position with the guide-way and in another position cut off the same. To operate the latches $c^7$, a hand lever $c^8$ together with suitable connecting arms and rods are provided as in the first instance.

The operation of the several parts of the dump having been fully set forth incidentally to the foregoing description thereof, it is taken that the advantages resident in the same are fully apparent. It should be pointed out, nevertheless, in conclusion that such dump forms an integral structure in itself, which, in view of the fact of its adaptability to various situations as has been pointed out, is of especial importance, for its independent and hence more economical manufacture is thereby made possible. In its operation, furthermore, the feature of automatic control and regulation of the various movements of the tilting track-section deserves attention not alone because of its automatic character but also because by means of it, much wear and tear of parts is avoided and the structure thus made more durable even when constructed of lighter material than has been heretofore deemed possible in car-dumping mechanism.

Having thus described my invention, that which I particularly point out and distinctly claim is:—

1. In mechanism of the class described, the combination with two supports, of a track-section independently oscillatory about the same, respectively.

2. In mechanism of the class described, the combination with two movable supports, of a track-section independently oscillatory about the same, respectively.

3. In mechanism of the class described, the combination with two independently movable supports, of a track-section oscillatory about the same, respectively.

4. In mechanism of the class described, the combination of two independently movable supports, a track-section oscillatory about the same, respectively, as axes, and means controlling the movement of said supports.

5. In mechanism of the class described, the combination of two independently movable supports, a track-section oscillatory about the same, respectively, as axes, and means normally positioning said track-section.

6. In mechanism of the class described, the combination of two independently movable supports, a track-section oscillatory about the same, respectively, as axes, means normally positioning said track-section, and means controlling the movement of said support.

7. In mechanism of the class described, the combination with two supports, of a track-section oscillatory in one direction about one of said supports to dump a car placed thereon and oscillatory in the other direction about the other support to discharge such car therefrom.

8. In mechanism of the class described, the combination with two supports, of a track-section oscillatory about one of said supports to dump a car placed thereon and oscillatory about the other support to discharge such car therefrom, said supports being independently movable.

9. In mechanism of the class described, the combination of two supports, a track-section oscillatory about one of said supports to dump a car placed thereon and oscillatory about the other support to discharge such car therefrom, said supports being independently movable, and means controlling the movement of said supports.

10. In mechanism of the class described, the combination of two supports, a track-section oscillatory about one of said supports to dump a car placed thereon and oscillatory about the other support to discharge such car therefrom, said supports being independently movable, and means normally positioning said track-section.

11. In mechanism of the class described, the combination of two supports, a track-section oscillatory about one of said supports to dump a car placed thereon and oscillatory about the other support to discharge such car therefrom, said supports being independently movable, means normally positioning said track-section, and means controlling the movement of said supports.

12. In mechanism of the class described, the combination with a movable track-section, of guide means adapted to independently control the movement of the respective ends of said track-section.

13. In mechanism of the class described, the combination of a vertically movable track-section, means normally elevating the same, the weight of a car on said track-section tending to depress the same, and means adapted to independently control the movement of the respective ends of said track-section.

14. The combination of a reciprocable track-section, means normally positioning the same, and means adapted to oscillate said track-section pending its reciprocation.

15. The combination with a counterpoised, reciprocable track-section, of means adapted to oscillate said track-section pending its reciprocation.

16. The combination of a counterpoised, reciprocable track-section, means adapted to oscillate said track-section pending its reciprocation, and means regulating such reciprocation.

17. The combination of a counterpoised, reciprocable track-section, means adapted to oscillate said track-section pending its reciprocation, and an automatic retarding device adapted to regulate such reciprocation.

18. The combination of a reciprocable track-section, means adapted to oscillate said track-section pending its reciprocation, and automatic retarding means adapted to regulate such reciprocation.

19. The combination of a reciprocable track-section, means normally positioning same, and a relatively fixed guide-way engaging said track-section and adapted to oscillate the same pending its reciprocation.

20. The combination of a counterpoised, reciprocable track-section, a relatively fixed guide-way engaging said track-section and adapted to oscillate the same pending its reciprocation, and automatic retarding means adapted to regulate such reciprocation.

21. The combination with a floating track-section, of two guide-ways respectively engaging said track-section at longitudinally separated points thereon.

22. The combination with a floating track-section, of two guide-ways respectively engaging said track-section at longitudinally separated points thereon, one of said ways being substantially vertical and the other substantially horizontal.

23. The combination with a floating track-section, of two guide-ways respectively engaging said track-section at longitudinally separated points thereon, one of said ways being substantially vertical, and the other comprising a substantially horizontal portion and a portion formed on the arc of a circle having the lower end of the first way as its center.

24. The combination with a floating track-section, of two guide-ways respectively engaging said track-section at longitudinally separated points thereon, one of said ways being substantially vertical and terminating at its lower end in a forwardly directed portion, and the other way comprising a substantially horizontal portion and a portion formed on the arc of a circle having the lower end of the first way as its center, and a latch controlling passage of the track-section from one portion to the other of the second way.

25. The combination with a floating track-section, of two guide-ways respectively engaging said track-section at longitudinally separated points thereon, one of said ways being substantially vertical and terminating at its lower end in a forwardly directed portion, and the other way comprising a substantially horizontal portion and a portion formed on the arc of a circle having the lower end of the first way as its center, and a manually operable latch controlling passage of the track-section from one portion to the other of the second way.

26. The combination with a floating track-section, of two guide-ways respectively engaging said track-section at longitudinally separated points thereon, one of said ways comprising a portion formed on the arc of a circle having a point on the other way as its center.

27. The combination with a floating track-section, of two guide-ways respectively engaging said track-section at longitudinally separated points thereon, one of said ways being formed with a pocket and the other way comprising a portion formed on the arc of a circle having such pocket as its center.

28. The combination with a floating track-section, of two guide-ways respectively engaging said track-section at longitudinally separated points thereon, one of said ways being terminally formed with a pocket and the other way comprising a portion formed on the arc of a circle having such pocket as its center.

29. In car-dumping mechanism, the combination with two tracks on different levels, of a floating track-section normally in register with one of said tracks but bodily movable into register with the other thereof.

30. The combination of two superposed tracks, a vertically reciprocable track-section adapted in different positions to register with said tracks, respectively, and means normally positioning said track-section.

31. The combination with two superposed tracks, of a counterpoised, vertically reciprocable track-section adapted in different positions to register with said tracks, respectively.

32. The combination of two superposed tracks, a vertically reciprocable track-section adapted in different positions to register with said tracks, respectively, and means adapted to oscillate said track-section pending its reciprocation.

33. The combination of two superposed tracks, a vertically reciprocable track-section adapted in different positions to register with the tracks respectively, and means adapted pending the reciprocation of said track-section to oscillate the same so as to incline in one direction when registering with the upper of said tracks and to incline in the other direction when registering with the lower thereof.

34. The combination of a reciprocable member, means normally positioning the same, and a track-section oscillatorily mounted upon said member and reciprocable therewith.

35. The combination of a reciprocable member, a track-section oscillatorily mounted thereon, and means adapted to oscillate said track-section pending the reciprocation of said member to incline first in one direction then in another.

36. The combination of a reciprocable member, means normally positioning the same, a track-section oscillatorily mounted upon said member, and means adapted to oscillate said track-section pending the reciprocation of said member.

37. The combination of a counterpoised reciprocable member, a track-section oscillatorily mounted thereon, and means adapted to oscillate said track-section pending the reciprocation of said member.

38. The combination of a counterpoised reciprocable member, a track-section oscillatorily mounted thereon, means adapted to oscillate said track-section pending the reciprocation of said member, and means regulating such reciprocation.

39. The combination of a counterpoised reciprocable member, a track-section oscillatorily mounted thereon, means adapted to oscillate said track-section pending the reciprocation of said member, and an automatic retarding device adapted to regulate the reciprocation of said member.

40. The combination of a reciprocable member, a track-section oscillatorily mounted thereon and reciprocable therewith, means adapted to oscillate said track-section pending the reciprocation of said member, and automatic retarding means adapted to regulate such reciprocation.

41. The combination of a reciprocable member, means normally positioning the same, a track-section pivotally mounted upon said member, and a relatively fixed guide-way engaging said track-section and adapted to oscillate the same pending the reciprocation of said member.

42. The combination of a counterpoised reciprocable member, a track-section pivotally mounted thereon, a relatively fixed guide-way engaging said track-section and adapted to oscillate the same pending the reciprocation of said member, and automatic retarding means adapted to regulate the reciprocation of said member.

43. The combination of a reciprocable member, a track-section pivotally mounted thereon, and two relatively fixed guide-ways respectively engaging said track-section at points located on opposite sides of its pivotal axis.

44. The combination of two superposed tracks; a vertically reciprocable member; and a track-section oscillatorily mounted upon said member and adapted in different positions thereof to register with said tracks respectively, and to incline in opposite directions when so registering.

45. The combination of two superposed tracks; a vertically reciprocable member; means normally positioning the same; and a track-section mounted on said reciprocable member and adapted in different positions thereof to register with said tracks respectively.

46. The combination of two superposed tracks; a counterpoised, vertically reciprocable member; and a track-section pivotally mounted on said member and adapted in different positions thereof to register with said tracks, respectively.

47. The combination of two superposed tracks; a vertically reciprocable member; a track-section pivotally mounted thereon, said track-section being adapted in different positions of said reciprocable member to register with said tracks respectively; and means adapted to oscillate said track-section about its pivotal axis pending the reciprocation of said member.

48. The combination of two superposed tracks; a vertically reciprocable member; a track-section pivotally mounted thereon, said track-section being adapted in different positions of said reciprocable member to register with said tracks respectively; and means adapted, pending the reciprocation of said member, to oscillate said track-section to incline in one direction when registering with the upper of said tracks and to incline in the other direction when registering with the lower thereof.

49. The combination of two superposed tracks; a vertically reciprocable member; means normally positioning the same; a track-section pivotally mounted thereon, said track-section being adapted in the normal position of said member to register with the upper of said tracks and in another position to register with the lower thereof; and means adapted to oscillate said track-section about its pivotal axis pending the reciprocation of said member.

50. The combination of two superposed tracks; a vertically reciprocable member; a track-section pivotally mounted thereon, said track-section being adapted in different positions of said reciprocable member to register with said tracks respectively; and means adapted to independently control the movements of the respective ends of said track-section pending the reciprocation of said member.

51. The combination of two superposed tracks; a vertically reciprocable member; a track-section pivotally mounted thereon, said track-section being adapted in different positions of said reciprocable member to register with said tracks respectively; and a relatively fixed guideway engaging said track-section and adapted to oscillate the same pending the reciprocation of said member.

52. The combination of two superposed tracks; a counterpoised, vertically reciprocable member; a track-section pivotally mounted thereon, said track-section being adapted in the normal position of said member to register with the upper of said tracks, and in another position to register with the lower thereof; a relatively fixed guideway engaging said track-section and adapted to oscillate the same pending the reciprocation of said member; and automatic retarding means adapted to regulate the reciprocation of said member.

53. The combination of two superposed tracks; a counterpoised, vertically reciprocable member; a track-section pivotally mounted thereon, said track-section being adapted in the normal position of said member to register with the upper of said tracks, and in another position to register with the lower thereof; a relatively fixed guideway engaging said track-section and adapted to oscillate the same pending the reciprocation of said member; and automatic retarding means adapted to regulate the reciprocation of said member, such means including a cylinder provided with a pass-pipe and a piston working in said cylinder.

54. The combination of two superposed tracks; a counterpoised, vertically reciprocable member; a track-section pivotally mounted thereon, said track-section being adapted in the normal position of said member to register with the upper of said tracks, and in another position to register with the lower thereof; a relatively fixed guideway engaging said track-section and adapted to oscillate the same pending the reciprocation of said member; and automatic retarding means adapted to regulate the reciprocation of said member, such means including a cylinder, a pass-pipe having a plurality of adjustable connections with said cylinder, and a piston working in said cylinder.

55. The combination of two superposed tracks; a counterpoised, vertically reciprocable member; a track-section pivotally mounted thereon, said track-section being adapted in the normal position of said member to register with the upper of said tracks, and in another position to register with the lower thereof; a relatively fixed guide-way engaging said track-section and adapted to oscillate the same pending the reciprocation of said member; and automatic retarding means adapted to regulate the reciprocation of said member, such means including a cylinder, a pass-pipe, connections between the respective ends of said pass-pipe with the corresponding ends of said cylinder, said connections being provided with inwardly operative check valves, a plurality of independently adjustable connections located intermediately of aforesaid connections, and a piston working in said cylinder.

56. The combination of two superposed tracks; a vertically reciprocable member; a track-section pivotally mounted thereon, said track-section being adapted in different positions of said reciprocable member to register with said tracks respectively; and two relatively fixed guide-ways respectively engaging said track-section at points on opposite sides of its pivotal axis.

57. In car-dumping mechanism, the combination with an oscillatory supporting member of a track-section pivotally mounted thereon and bodily movable therewith.

58. In car-dumping mechanism, the combination of an oscillatory supporting member; means normally positioning the same; and a track-section pivotally mounted upon said member and bodily movable therewith.

59. In mechanism of the class described, the combination of a floating track-section, an oscillatory support therefor, and means adapted to regulate oscillation of said support.

60. The combination of two superposed tracks; a vertically reciprocable oscillatory supporting member; and a track-section pivotally mounted on said supporting member and adapted in different positions thereof to register with said tracks respectively.

61. The combination of two superposed tracks; a supporting member oscillatory about a horizontal axis; a track-section pivotally mounted on said supporting member and adapted in different positions thereof to register with said tracks respectively; and means adapted to oscillate said track-section about its pivotal axis pending the movement of said supporting member.

62. The combination of two superposed tracks; a supporting member oscillatory about a horizontal axis; a track-section pivotally mounted on said supporting member and adapted in different positions thereof to register with said tracks respectively; and means adapted to independently control the movements of the respective ends of said track-section pending the oscillation of said supporting member.

63. The combination of two superposed tracks; a supporting member oscillatory about a horizontal axis; a track-section pivotally mounted on said supporting member and adapted in different positions thereof to register with said tracks respectively; and means adapted, pending the reciprocation of said member, to oscillate said track-section to incline in one direction when registering with the upper of said tracks and to incline in the other direction when registering with the lower thereof.

64. The combination of two superposed tracks; a supporting member oscillatory about a horizontal axis; a track-section pivotally mounted on said supporting member and adapted in different positions thereof to register with said tracks respectively; and a relatively fixed guide-way engaging said track-section and adapted to oscillate the same pending the movement of said supporting member.

65. The combination of two superposed tracks; a supporting member oscillatory about a horizontal axis; a track-section pivotally mounted on said supporting member and adapted in different positions thereof to register with said tracks respectively; and two relatively fixed guide-ways respectively engaging said track-section at points on opposite sides of its pivotal axis and adapted to oscillate the same pending the movement of said supporting member.

66. In mechanism of the class described, the combination of a floating track-section, and an oscillatory support of variable length for said track-section.

67. In mechanism of the class described, the combination of a floating track-section, an oscillatory support of variable length for said track-section, and means adapted to regulate oscillation of said support.

68. In mechanism of the class described, the combination of a floating track-section, an oscillatory support of variable length for said track-section, and means connected directly with said support and adapted to regulate oscillation thereof.

69. In mechanism of the class described, the combination of a floating track-section, an oscillatory lever member of variable length connected therewith, and guide means adapted to oscillate said track-section with respect to said member upon movement of the section.

70. In mechanism of the class described, the combination of a floating track-section, an oscillatory lever member of variable length connected therewith, means for bodily moving said track-section, and relatively fixed guide means adapted to oscillate said track-section with respect to said member upon such bodily movement of the section.

71. In mechanism of the class described, the combination of a floating track-section, a lever member oscillatory about a fixed axis, and guide means adapted to oscillate said track-section with respect to said member upon movement of the section.

72. In mechanism of the class described, the combination of a floating track-section, a lever member oscillatory about a fixed axis, means for bodily moving said track-section, and relatively fixed guide means adapted to oscillate said track-section with respect to said member upon such bodily movement of the section.

73. In mechanism of the class described, the combination of a floating track-section, a lever member of variable length oscillatory about a fixed axis, and guide means adapted to oscillate said track-section with respect to said member upon movement of the section.

74. In mechanism of the class described, the combination of a floating track-section, a lever member of variable length oscillatory about a fixed axis, means for bodily moving said track-section, and relatively fixed guide means adapted to oscillate said track-section with respect to said member upon such bodily movement of the section.

75. In car-dumping mechanism, the combination with an oscillatory supporting member transversely movable with respect to its axis of oscillation, of a track-section pivotally mounted on said supporting member.

76. In car-dumping mechanism, the combination of an oscillatory supporting member transversely movable with respect to its axis of oscillation; means normally positioning the same with respect to such axis; and a track-section pivotally mounted on said supporting member.

77. In car-dumping mechanism, the combination with a counterpoised, oscillatory supporting member transversely movable with respect to its axis of oscillation; of a track-section pivotally mounted upon said member.

78. In car-dumping mechanism, the combination of a counterpoised, oscillatory supporting member transversely movable with respect to its axis of oscillation; means controlling such movement of said member and a track-section pivotally mounted upon said member.

79. In car-dumping mechanism, the combination of a counterpoised, oscillatory supporting member transversely movable with respect to its axis of oscillation; automatic retarding means adapted to control such movement; a track-section pivotally mounted on said supporting member; and means adapted to oscillate said track-section pending such movement of said supporting member.

80. The combination of two superposed tracks; an oscillatory supporting member transversely movable with respect to its axis of oscillation; and a track-section pivotally mounted on said supporting member and adapted in different positions thereof to register with said tracks respectively.

81. The combination of two superposed tracks; a supporting member oscillatory about a horizontal axis and transversely movable with respect to the same; a track-section pivotally mounted on said supporting member and adapted in different positions thereof to register with said tracks respectively; and means adapted to oscillate said track-section about its pivotal axis pending the movement of said supporting member.

82. The combination of two superposed tracks; a supporting member oscillatory about a horizontal axis and transversely movable with respect to the same; a track-section pivotally mounted on said supporting member and adapted in different positions thereof to register with said tracks respectively; and means adapted to independently control the movements of the respective ends of said track-section pending the movement of said supporting member.

83. The combination of two superposed tracks; a supporting member oscillatory about a horizontal axis and transversely movable with respect to the same; a track-section pivotally mounted on said supporting member and adapted in different positions thereof to register with said tracks respectively; and a relatively fixed guideway engaging said track-section and adapted to oscillate the same pending the movement of said supporting member.

84. The combination of two superposed tracks; a supporting member oscillatory about a horizontal axis and transversely movable with respect to the same; a track-section pivotally mounted on said supporting member and adapted in different positions thereof to register with said tracks respectively; and two relatively fixed guideways respectively engaging said track-section at points on opposite sides of its pivotal axis and adapted to oscillate the same pending the movement of said supporting member.

85. In car-dumping mechanism, the combination of a track; a supporting member both oscilatorily and transversely movable with respect to said track; a track-section pivotally mounted on said member and adapted in one position thereof to register with said track; and corresponding guide-means on each side of said track-section adapted to oscillate the same upon movement of said member, said means including two ways engaging said track-section at points on opposite sides of its pivotal axis, respectively.

86. In car-dumping mechanism, the combination of a track; a supporting member both oscillatorily and transversely movable with respect to said track; a track-section pivotally mounted on said member and adapted in one position thereof to register with said track; and corresponding guide-means on each side of said track-section adapted to oscillate the same upon movement of said member, said means including two ways engaging said track section at points on opposite sides of its pivotal axis, respectively, the foremost of said ways, having regard to the direction of discharge, being substantially vertical and the rearmost substantially horizontal.

87. In car-dumping mechanism, the combination of two superposed tracks; a supporting member both oscillatorily and transversely movable with respect to said tracks; a track-section pivotally mounted upon said member and adapted in different positions thereof to register with said tracks, respectively, and corresponding guide-means on each side of said track-section adapted to oscillate the same upon movement of said member, said means including two ways engaging said track-section at points on opposite sides of its pivotal axis, the foremost of said ways, having regard to the direction of discharge, being substantially vertical, and the rearmost comprising a substantially horizontal portion and a portion formed on the arc of a circle having the lower end of the foremost way as its center.

88. In car-dumping mechanism, the combination of two superposed tracks; a supporting member both oscillatorily and transversely movable with respect to said tracks; a track-section pivotally mounted upon said member and adapted in different positions thereof to register with said tracks, respectively, and corresponding guide-means on each side of said track-section adapted to oscillate the same upon movement of said member, said means including two ways engaging said track-section at points on opposite sides of its pivotal axis, the foremost of said ways, having regard to the direction of discharge, being substantially vertical and terminating at its lower end in a forwardly directed portion, and the rearmost way comprising a substantially horizontal portion and a portion formed on the arc of a circle having such lower end of the foremost way as its center, and a latch in such rearmost way adapted to control the passage of the track-section from one portion thereof to the other.

89. In car-dumping mechanism, the combination of two superposed tracks; a supporting member both oscillatorily and transversely movable with respect to said tracks; a track-section pivotally mounted upon said member and adapted in different positions thereof to register with said tracks, respectively, and corresponding guide-means on each side of said track-section adapted to oscillate the same upon movement of said member, said means including two ways engaging said track-section at points on opposite sides of its pivotal axis, the foremost of said ways, having regard to the direction of discharge, being substantially vertical and terminating at its lower end in a forwardly directed portion, and the rearmost way comprising a substantially horizontal portion and a portion formed on the arc of a circle having such lower end of the foremost way as its center, and a manually operable latch in such rearmost way adapted to control the passage of the track-section from one portion thereof to the other.

90. In mechanism of the class described, the combination of two superposed tracks; a supporting member both oscillatorily and transversely movable with respect to said tracks; a track-section pivotally mounted upon said member and adapted in different positions thereof to register with said tracks, respectively; and corresponding guide means on each side of said track-section adapted to oscillate the same upon movement of said member, said means including two ways engaging said track-section at points on opposite sides of its pivotal axis, one of said ways comprising a portion formed on the arc of a circle having a point on the other way as its center.

91. In mechanism of the class described, the combination of two superposed tracks; a supporting member both oscillatorily and transversely movable with respect to said tracks; a track-section pivotally mounted upon said member and adapted in different positions thereof to register with said tracks, respectively; and corresponding guide means on each side of said track-section adapted to oscillate the same upon movement of said member, said means including two ways engaging said track-section at points on opposite sides of its pivotal axis, one of said ways being formed with a pocket and the other way comprising a portion formed on the arc of a circle having such pocket as its center.

92. In mechanism of the class described, the combination of two superposed tracks; a supporting member both oscillatorily and transversely movable with respect to said tracks; a track-section pivotally mounted upon said member and adapted in different positions thereof to register with said tracks, respectively; and corresponding guide means on each side of said track-section adapted to oscillate the same upon movement of said member, said means including two ways engaging said track-section at points on opposite sides of its pivotal axis, one of said ways being terminally formed with a pocket and the other way being formed on the arc of a circle having such pocket as its center.

93. In car-dumping mechanism, the combination of a movable supporting member; counterweight means normally positioning the same; means for regulating the movement of said member; and a track-section oscillatorily supported by said member.

94. In car-dumping mechanism, the combination of a movable supporting member;

counterweight means normally positioning the same; automatic retarding means for regulating the movement of said member; and a track-section oscillatorily supported by said member.

95. In car-dumping mechanism, the combination of a supporting member having both a translatory and an oscillatory movement; counterweight means normally positioning the same; automatic retarding means regulating the movement of said member; a track-section oscillatorily supported by said member; and means adapted to oscillate said track-section upon movement of said member.

96. In car-dumping mechanism, the combination of a cylinder provided with a pass-pipe; a piston and piston head operating in said cylinder; a counterweight normally positioning the same; a track-section oscillatorily supported by said piston; and means adapted to oscillate said track-section upon movement of said piston.

97. In car-dumping mechanism, the combination of a cylinder oscillatorily mounted on a fixed support and provided with a pass-pipe; a piston and piston-head operating in said cylinder; a counterweight normally positioning the same; a track-section pivotally mounted upon said piston; and guide-ways engaging said track-section and adapted to oscillate the same pending the movements of said piston.

98. In car-dumping mechanism, the combination of a cylinder oscillatorily mounted on a fixed support; a pass-pipe having a plurality of adjustable connections with said cylinder; a piston and piston-head operating in said cylinder; a counterweight normally positioning the same; a track-section pivotally mounted upon said piston; and guide-ways engaging said track-section and adapted to oscillate the same pending the movements of said piston.

99. In car-dumping mechanism, the combination of a cylinder oscillatorily mounted on a fixed support; a pass-pipe mounted on said cylinder; connections between the respective ends of said pass-pipe and the corresponding ends of said cylinder, said connections being provided with inwardly operative check-valves; a plurality of independently adjustable connections located intermediately of aforesaid connections; a piston and piston-head operating in said cylinder; a counterweight normally positioning the same; a track-section pivotally mounted upon said piston; and guide-ways engaging said track-section and adapted to oscillate the same pending the movements of said piston.

100. In car-dumping mechanism, the combination of a cylinder; a pass-pipe mounted on said cylinder; connections between the respective ends of said pass-pipe and the corresponding ends of said cylinder, said connections being provided with inwardly operative check-valves; a plurality of independently adjustable connections located intermediately of aforesaid connections; a piston and piston head operating in said cylinder; a counterweight normally positioning the same; and a track-section oscillatorily supported by said piston.

101. In mechanism of the class described, automatic retarding means comprising a cylinder, a pass-pipe mounted on said cylinder; connections between the respective ends of said pass-pipe and the corresponding ends of said cylinder, said connections being provided with inwardly operative check-valves; a plurality of independently adjustable connections located intermediately of aforesaid connections; and a piston and piston head operating in said cylinder.

102. The combination of a tilting car support, a cylinder, a piston therein connected to the support and movable in said cylinder when said support is tilting, and means for passing liquid intermittently from in front of the piston as the latter moves in said cylinder.

103. The combination of a tilting car support, a cylinder, a piston therein connected to the support and movable inwardly in said cylinder when said support is tilting, and means for passing liquid intermittently from in front of the piston as the latter moves inward in said cylinder.

104. The combination of a tilting car support, a cylinder, a piston therein connected to said support and movable in said cylinder when said support is tilting, and means operative intermittently for passing liquid from in front of the piston to the rear thereof during the tilting movement, said means including a pass pipe for said cylinder, and a valve adapted to open and close the same.

105. The combination of a tilting car support, a cylinder, a piston therein connected to said support and movable in said cylinder when said support is tilting, a pass pipe for said cylinder adapted to pass liquid from in front to the rear of said piston, and a manually operable valve in said pass pipe, whereby the latter may be partially or entirely closed, as desired.

106. The combination of car-tilting means, a cylinder, a piston therein connected to the tilting means so as to move inwardly upon operation of the latter, and means for alternately checking and releasing the piston as it moves inward.

107. The combination of car-tilting means, a cylinder, a piston therein connected to the tilting means so as to move inwardly upon operation of the latter, and means for alternately checking and releasing the piston as it moves inward, such means including a pass pipe for said cylinder, and a valve adapted to close and open the same.

108. The combination of car-tilting means, a cylinder, a piston therein connected to the tilting means so as to move inwardly upon operation of the latter, and means for alternately checking and releasing the piston as it moves inward, such means including a pass pipe for said cylinder, and a manually operable valve adapted to close and open the same.

Signed by me, this 10th day of August 1906.

FRANK C. GREENE.

Attested by—
O. V. GREENE,
GEORGE M. GARRETT.